O. JUNGGREN.
BAFFLER.
APPLICATION FILED SEPT. 1, 1909.

993,831.

Patented May 30, 1911.

2 SHEETS—SHEET 1.

Witnesses:

Inventor:
Oscar Junggren,
by Albert G. Davis,
Att'y.

O. JUNGGREN.
BAFFLER.
APPLICATION FILED SEPT. 1, 1909.

993,831.

Patented May 30, 1911.

2 SHEETS—SHEET 2.

Witnesses:

Inventor:
Oscar Junggren
by
Att'y.

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

BAFFLER.

993,831.    Specification of Letters Patent.   Patented May 30, 1911.

Application filed September 1, 1909. Serial No. 515,641.

*To all whom it may concern:*

Be it known that I, OSCAR JUNGGREN, a citizen of the United States, residing at Schenectady, county of Schenectady, State of New York, have invented certain new and useful Improvements in Bafflers, of which the following is a specification.

This invention relates to systems of lubrication for elastic fluid turbines wherein the oil or other lubricant is forced under pressure through lines of piping to the various shaft bearings and to the hydraulic valve gear, if such a gear be used. In such systems the step bearing requires a much higher pressure than the guide bearings and hydraulic gear, and it is customary to use baffling devices in the several pipes in order to cause the lubricant to divide in proper proportions and have the proper relative pressures. These bafflers also automatically regulate the flow and maintain it substantially constant irrespective of variations in pressure. They are made adjustable in order to vary the flow or the pressure at will, and to permit regulation in case the temperature or viscosity of the oil changes, since both these factors produce a decided alteration in the flow and pressure.

The present invention consists in an improved baffler, its object being to afford a wider range of adjustment without increase in the dimensions of the device or the cost of manufacturing it.

To this end, it comprises a baffler plug having a tortuous groove or passage which gradually increases in cross-sectional area from one end to the other.

Figure 1:
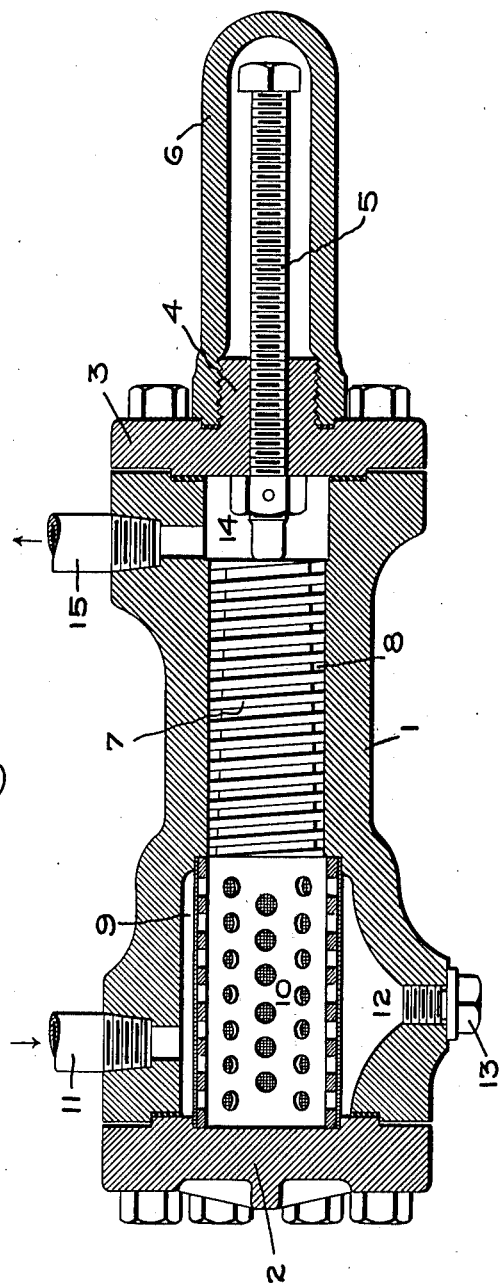
Figure 3:
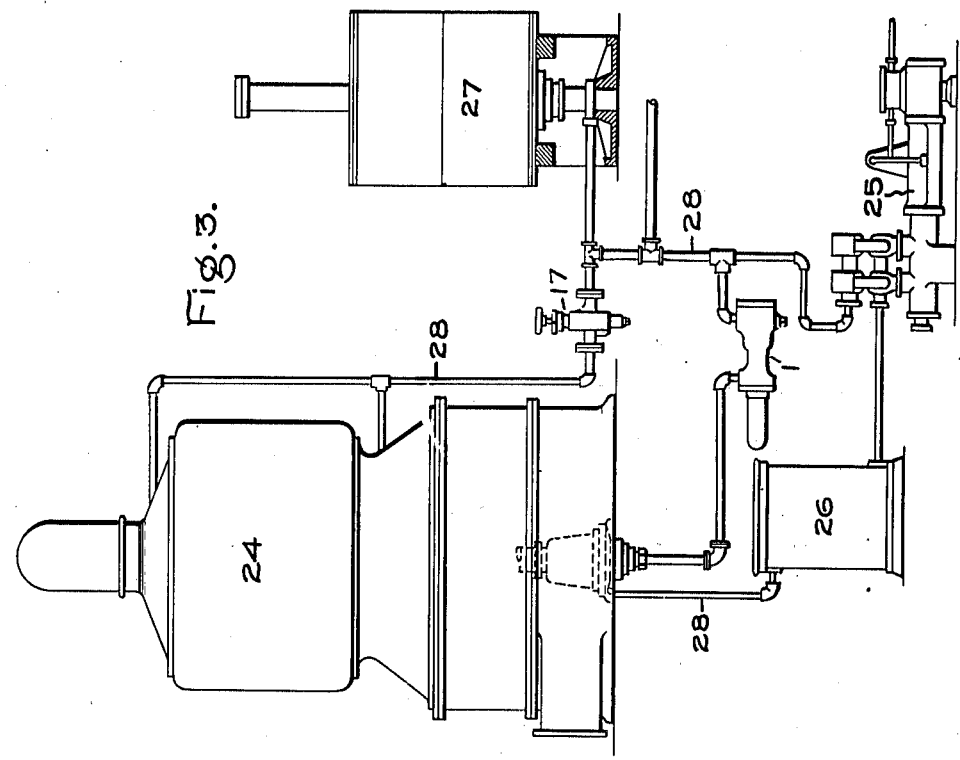
Figure 2:
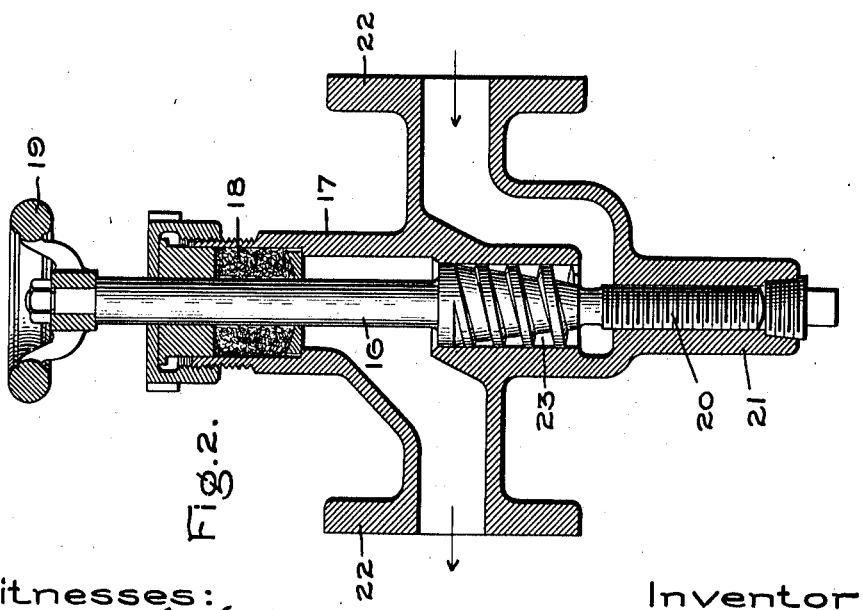

In the accompanying drawings Figure 1 shows a longitudinal section of a baffler designed for use in a high pressure lubricating system in series with the step bearing of a vertical turbine. Fig. 2 is a longitudinal section of a baffler for a low pressure system, such as the upper bearings of vertical machines, or any of the bearings of horizontal machines. Fig. 3 shows a vertical turbine with a lubricating system embodying these bafflers.

Referring first to Fig. 1, the tubular body 1 has a plain head 2 at one end, and at the other end a head 3 having a central hub 4 containing a longitudinal screw-threaded hole in which meshes a screw 5. A removable cap 6 is secured to the hub 4 and incloses the projecting portion of said screw. For a portion of its length, the body has a cylindrical bore to receive a cylindrical plug 7 in whose outer surface is cut a helical groove 8 which increases gradually in depth from one end to the other. The screw 5 abuts against the foot of the plug, that is that end where the groove is the deepest, and by means of said screw the plug can be pushed lengthwise to any extent desired into a chamber 9 of larger diameter. A perforated cylindrical tubular strainer 10 is inclosed in said chamber, into which the head of the plug enters. The pipe 11 through which the lubricant is supplied by the pump, delivers into the chamber 9 outside of said strainer. A well 12, with a drain plug 13, affords means for cleaning out said chamber. Between the foot of the plug and the head 3 of the body is a small chamber 14 from which runs the pipe 15 which conveys lubricant to the step bearing.

In Fig. 1 the baffler can be adjusted only by taking off the cap 6 and applying a wrench to the head of the screw 5. In Fig. 2 the baffler plug is integral with or secured to the stem 16 which passes out of the casing 17 through a stuffing box 18 and has a handle 19. An extension 20 of the baffler is screw-threaded and engages with a screw-threaded hub 21 on the casing 17. Flanged necks 22 are provided on said casing for coupling it to adjacent lengths of piping. The baffler plug has a helical groove 23 gradually increasing in depth from the outlet end to the inlet. The flow through the baffler can be in the opposite direction if desired.

Fig. 3 shows a vertical turbine 24 and in connection therewith the customary pump 25 for forcing the lubricant, the settling tank 26 into which the oil drains from the bearings of the turbine, the accumulator 27 for governing the pressure of the lubricant, the system of piping 28 for conveying oil from the pump to the step and other bearings of the turbine, and for returning oil from the bearings to the pump, and bafflers 1 and 17, of the kind above described, for maintaining the proper pressures and flow. The varying cross-section of the groove in these bafflers gives a wider range of adjustment in flow and pressure for a given length of plug than is the case where the groove is of uniform area throughout. It produces a large variation in pressure drop with a given flow, or, what is practically the same thing, a different flow of lubricant with no change in pressure drop. For the maximum baffling effect, the full length of the groove is kept in the cylinder, while for a lesser baffling, the end of the plug where the groove is smaller, is moved out beyond the end of said cylinder, so that the turns of the groove at that end are more or less cut out and the effective length of the groove is shortened, while the portion in use has a larger average cross section than before. This simultaneous decrease in length and increase in area produces a greater change in the flow or the pressure or both than could be accomplished by a similar shortening of a plug whose thread is of uniform depth.

In accordance with the provisions of the patent statutes, I have described the principle of operation of my invention together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. A baffler for use in a system of forced lubrication, comprising a casing having a cylindrical bore, a plug arranged in the bore and having a tortuous passage gradually increasing in cross-sectional area from one end to the other, and means for adjusting the plug and bore relatively to each other to vary the effective length of the passage.

2. A baffler for use in a system of forced lubrication, comprising a casing having a cylindrical bore, a plug fitting said bore and having a helical groove of gradually increasing depth, and means for adjusting said plug lengthwise in the bore to vary the effective length of the groove.

3. A baffler for use in a system of forced lubrication, comprising a casing having a cylindrical bore and a chamber at one end of larger diameter than said bore, a cylindrical plug fitting said bore and provided with a helical groove of gradually increasing depth, the length of the bore being at least as long as the axial length of the groove, and a screw for moving into said chamber that end of said plug where the groove is shallower to vary the effective length of the groove.

4. A baffler for use in a system of forced lubrication, comprising a casing having a bore, a plug mounted in the bore and having a helical passage in its periphery which gradually increases in cross-sectional area from one end to the other, and means for varying the effective length of the passage by moving the smaller end of the passage into and out of said bore.

5. A baffler for use in a system of forced lubrication, comprising a casing having a cylindrical bore, a plug mounted in the casing and having a helical groove gradually decreasing in depth from its inlet to its outlet, the length of the bore being at least as long as the axial length of the groove, and means for cutting out the turns of said groove beginning at the outlet end.

In witness whereof, I have hereunto set my hand this 27th day of August, 1909.

OSCAR JUNGGREN.

Witnesses:
BENJAMIN B. HULL,
MARGARET E. WOOLLEY.